United States Patent
Jennen

(10) Patent No.: US 7,505,686 B2
(45) Date of Patent: Mar. 17, 2009

(54) HIGHLY SCALABLE MULTI-GRANULAR NODE ARCHITECTURE

(75) Inventor: Jean Gerardus Leonardus Jennen, Huizen (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 461 days.

(21) Appl. No.: 11/217,887

(22) Filed: Sep. 1, 2005

(65) Prior Publication Data

US 2007/0092248 A1    Apr. 26, 2007

(51) Int. Cl.
*H04J 14/00*    (2006.01)
*G02B 6/26*    (2006.01)

(52) U.S. Cl. ............................. 398/49; 398/45; 398/48; 398/50; 398/55; 398/56

(58) Field of Classification Search .................. 398/45, 398/48, 49, 50, 55, 56; 385/16
See application file for complete search history.

(56) References Cited

U.S. PATENT DOCUMENTS

| | | | | |
|---|---|---|---|---|
| 5,175,777 | A * | 12/1992 | Bottle | 385/17 |
| 5,892,604 | A * | 4/1999 | Yamanaka et al. | 398/48 |
| 5,973,809 | A | 10/1999 | Okayama et al. | |
| 6,768,827 | B2 * | 7/2004 | Yoo | 385/14 |
| 6,892,032 | B2 * | 5/2005 | Milton et al. | 398/79 |
| 7,088,919 | B2 * | 8/2006 | Graves | 398/50 |
| 2002/0105692 | A1 * | 8/2002 | Lauder et al. | 359/124 |
| 2003/0133641 | A1 | 7/2003 | Yoo | |

FOREIGN PATENT DOCUMENTS

| | | |
|---|---|---|
| EP | 1 182 905 A | 2/2002 |
| EP | 05 25 5352 | 2/2006 |
| WO | WO 2004/028197 A | 4/2004 |

OTHER PUBLICATIONS

R. Parthiban, et al., "Waveband Grooming and IP Aggregation in Optical Networks," J. of Lightwave Tech., vol. 21, No. 11, Nov. 2003, pp. 2476-2488.

X. Cao et al., "A Study of Waveband Switching With Multilayer Multigranular Optical Cross-Connects," IEEE J. on Selected Areas in Communications, vol. 21, No. 7 Sep. 2003, pp. 1081-1095.

P-H. Ho et al., "A Scalable Design of Multigranularity Optical Cross-Connects for the Next-Generation Optical Internet," IEEE J. on Selected Areas in Communications, vol. 21, No. 7, Sep. 2003, pp. 1133-1142.

R. A. Jensen and N. Hagood, "Economic Comparison of Emerging OEO and Hybrid OEO/OOO Optical Switching Architectures for Metro Core Networks," Proceedings NFOEC2003, Orlando, FL, USA, Sep. 2003.

R. Parthiban et al., "Does Optical Burst Switching Have a Role in the Core Network?", Proceedings OFC2005, Mar. 2005, Anaheim, CA USA, OWC2.

T. S. Tucker et al., "Modeling and Analysis of Optical Networks with Traffic Grooming," IEEE LEOS Lasers and Electro Optics Conference 2004 Proceedings, Rio Grande, Nov. 2004, TuCC1, pp. 422-423.

* cited by examiner

*Primary Examiner*—Kenneth N Vanderpuye
*Assistant Examiner*—Daniel G Dobson

(57) ABSTRACT

Highly Scalable Multi-granular Node Architecture based upon strictly non-blocking waveband switch constructed around cyclic arrayed waveguide grating (AWG) routers. In one implementation, the invention includes a first N×N cyclic arrayed waveguide grating (AWG); a middle stage includes N tuner modules, and a second N×N cyclic AWG for routing information from a plurality of different optical networks. Another implementation of the invention further provides an add/drop switch, and a shuffler for performing add/drop functions and preserving the wavelength order.

17 Claims, 3 Drawing Sheets

HIGHLY SCALABLE MULTI-GRANULAR NODE ARCHITECTURE

FIELD OF THE INVENTION

The invention is related to the field of optical telecommunications, and in particular, to optical switching architectures.

BACKGROUND OF THE INVENTION

The use of dense wavelength division multiplexing (DWDM) offers efficient transportation of several Terabit/s per single fiber. The high level of aggregation of information in an optical signal, on the other hand, increases the amount of processing required in order to access a single packet of information on an optical signal.

SUMMARY

Various deficiencies of the prior art are addressed by the present invention of highly scalable multi-granular switching approaches.

In one embodiment, switching architecture includes a multiplexing stage, adapted for combining component channel wavelengths from a plurality of distinct optical networks. A first N×N cyclic arrayed waveguide grating (AWG). A middle stage having N tuner modules coupled to the output portion of the first N×N cyclic AWG. A second N×N cyclic AWG having a second input portion coupled to the middle stage wherein the optical signals includes at least core and metro network optical signals.

Another embodiment of the invention provides for adding and dropping of a combination of wavelengths and wavebands.

Another embodiment of the invention includes providing for preservation of wavelengths order in the optical signals.

An aspect of the invention provides for an optical switching architecture implementing the methods of adding, routing, dropping and preserving. The method includes multiplexing wavebands from a plurality of distinct optical networks including adding information from the local network. The method also includes steps for cyclically routing optical signals without changing its characteristics, demultiplexing wavelengths from wavebands for dropping information, and preserving the wavelength order within the optical signals.

Another aspect of the invention provides for an optical network including a first N×N cyclic AWG for cyclically routing wavebands of N unprocessed WDM optical signals. A middle stage adapts wavebands to provide thereby N processed WDM optical signals. A second N×N cyclic AWG cyclically routes N processed WDM optical signals. An add/drop switch receives wavelengths from the second AWG for dropping and selectively communicates added optical signals to the first AWG. A feedback shuffler preserves the wavelength order of the N unprocessed WDM optical signals.

The invention further provides other methods and system elements that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of multi-granular, multi-service node architecture; however, those skilled in the art and informed by the teachings herein will realize that the invention is also applicable to any apparatus and method that involves switching of optical signals in a communications network.

Figure 1:
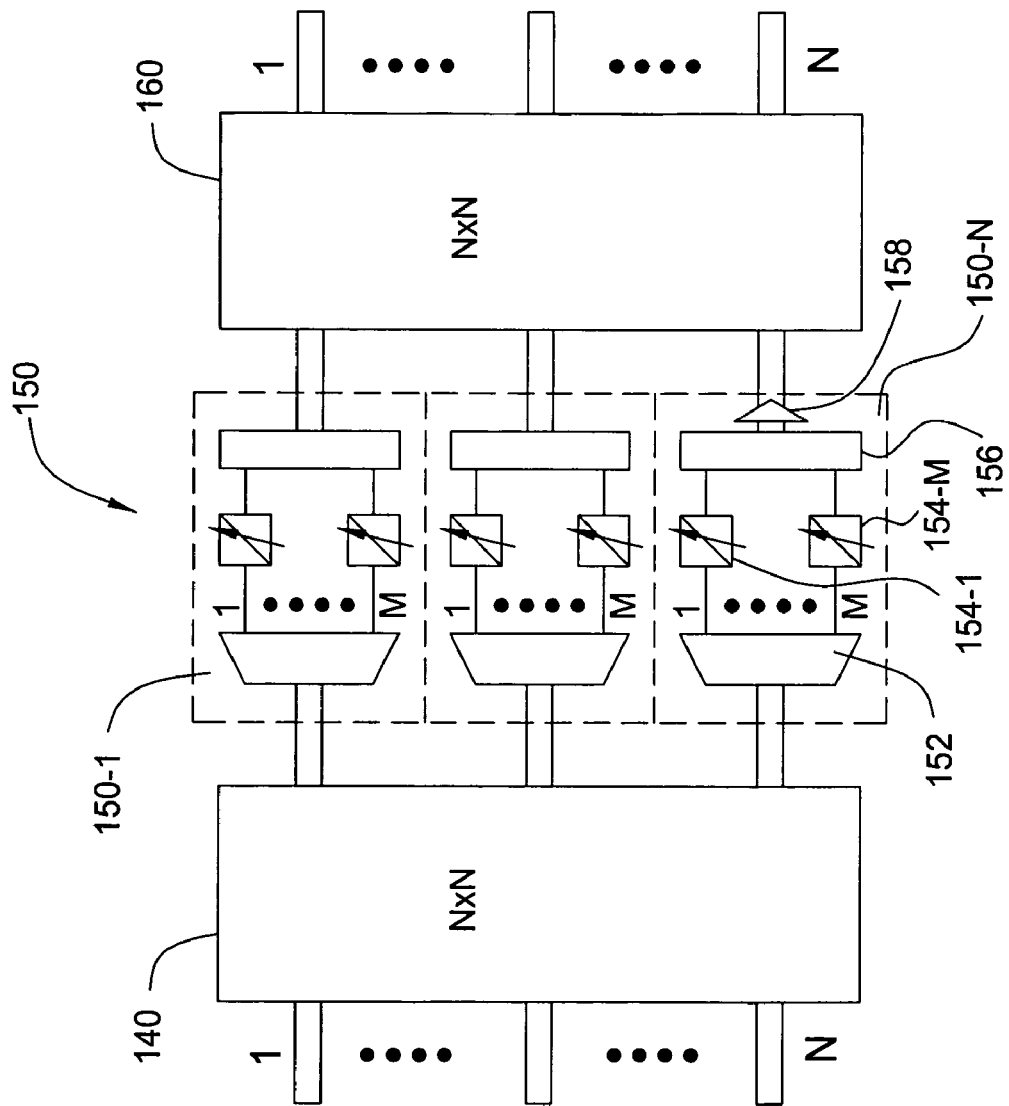
FIG. 1 depicts a block diagram of a waveband switching architecture according to an embodiment of the invention.

FIG. 1 depicts a block diagram of a waveband switching architecture 100 according to an embodiment of the invention. The switching architecture 100 receives, illustratively, N dense wavelength division multiplexing (DWDM) optical signals and selectively switches the N DWDM signals between any of the input ports to any of the output ports without any internal blocking at the waveband level. In one embodiment, waveband contains an integer multiple of N consecutive wavelengths. The switching architecture 100 can switch optical signals such as wavebands, fiber or mixture of both. In this embodiment, the architecture has a first N×N cyclic arrayed waveguide grating (AWG) 140, a middle stage 150, and a second N×N cyclic AWG 160. The functions of the first AWG 140, middle stage 150 and second AWG 160 are described in detail in co-pending U.S. patent application Ser. No. 11/218,200 filed on Sep. 1, 2005, entitled "Non-blocking Cyclic AWG-based Node Architectures," which is hereby incorporated herein by reference in its entirety.

Illustratively, the first N×N cyclic AWG 140 comprises N input ports and N output ports. Optical signals are routed from the input ports to the output ports according to wavelengths. The first N×N cyclic AWG 140 receives N DWDM input signals via respective ones of the N optical fibers (1 through N), where N is an integer greater than 1. The first AWG 140 cyclically distributes information from N input ports to N output ports.

The distribution of wavelengths of cyclic AWG is well known in the art. The N×N cyclic AWG 150 distributes the wavelengths at any AWG input port over the N output ports in a cyclic manner. For example, if there are 3 input ports and 3 output ports (i.e., N=3) and there are 12 channels on the WDM signal (i.e., M=12), then each wavelength will be switched cyclically as described, for example, in Table 1. That is, for the DWDM signal that is communicated to input port 1 of the AWG, the first wavelength of the DWDM signal will be switched to output port 3, the second wavelength will be switched to output port 2, the third wavelength will be switched to output port 1, the fourth wavelength will be switched to output port 3 and so on. For the DWDM signal that is communicated to input port 2 of the AWG, the first wavelength will be switched to output port 2, the second wavelength will be switched to output port 1, the third wavelength will be switched to output port 3, the fourth wavelength will be switched to output port 2 and so on. For the DWDM signal that is communicated to input port 3 of the AWG, the first wavelength will be switched to output port 1, the second wavelength will be switched to output port 3, the third wavelength will be switching to output port 2, the fourth wavelength will be switched to output port 1 and so on.

communicatively receives the DWDM signals from the output ports of the middle stage 150. The second AWG 160

TABLE 1

| | $\lambda_1$ | $\lambda_2$ | $\lambda_3$ | $\lambda_4$ | $\lambda_5$ | $\lambda_6$ | $\lambda_7$ | $\lambda_8$ | $\lambda_9$ | $\lambda_{10}$ | $\lambda_{11}$ | $\lambda_{12}$ | | | Output port 1 | Output port 2 | Output port 3 |
|---|---|---|---|---|---|---|---|---|---|---|---|---|---|---|---|---|---|
| Input port 1 | 3 | 2 | 1 | 3 | 2 | 1 | 3 | 2 | 1 | 3 | 2 | 1 | Input port | 1 | $\lambda_3 \lambda_6 \lambda_9 \lambda_{12}$ | $\lambda_2 \lambda_5 \lambda_8 \lambda_{11}$ | $\lambda_1 \lambda_4 \lambda_7 \lambda_{10}$ |
| 2 | 2 | 1 | 3 | 2 | 1 | 3 | 2 | 1 | 3 | 2 | 1 | 3 | | 2 | $\lambda_2 \lambda_5 \lambda_8 \lambda_{11}$ | $\lambda_1 \lambda_4 \lambda_7 \lambda_{10}$ | $\lambda_3 \lambda_6 \lambda_9 \lambda_{12}$ |
| 3 | 1 | 3 | 2 | 1 | 3 | 2 | 1 | 3 | 2 | 1 | 3 | 2 | | 3 | $\lambda_1 \lambda_4 \lambda_7 \lambda_{10}$ | $\lambda_3 \lambda_6 \lambda_9 \lambda_{12}$ | $\lambda_2 \lambda_5 \lambda_8 \lambda_{11}$ |

The middle stage 150 includes N tuner modules (150-1 through 150-N). where N is an Integer greater than 1. Each one of the N tuner modules is adapted to receive one of N DWDM signals from the first AWG 140. Each one of the N DWDM signals includes a plurality of component optical signals having respective wavelengths, illustratively M component optical signals operating at respective wavelengths, denoted as wavelengths $\lambda_1$ through $\lambda_M$. Each of the M wavelengths represents a waveband within the DWDM signal; therefore, M is an integer equal to the number of wavebands in the DWDM signal. In one embodiment, the number of wavelengths M supported in each of the tuner modules 120 is selected as an integer multiple of N. Other selections of M may be utilized.

A waveband is defined as a set of multiple consecutive wavelengths. In this embodiment, wavebands contain an integer multiple of N wavelengths. The sum of wavelengths in all wavebands equals M. Consequently, M is also an integer multiple of N. When utilizing another selection of M the wavelength converters still need to support the whole wavelength range from $\lambda_1$ to $\lambda_{N \cdot [M/N]}$.

Each one of the N tuner modules 150 comprises a demultiplexer 152, a plurality (illustratively M) of tunable wavelength converters 154-1 to 154-M (collectively wavelength converters 154) and a combiner 156. For each of the N tuner modules 150, the wavelength demultiplexer 152 separates its received DWDM input signal into a plurality of component wavelengths or channels (illustratively wavelengths $\lambda_1$ through $\lambda_M$). Each of the M demultiplexed wavelengths or channels is selectively processed by a respective one of the M wavelength converters 154.

The tunable wavelength converters 154 operate to convert information bearing optical signal of one wavelength into information bearing optical signal of the same or another wavelength. That is, each tunable wavelength converter 154 receives a respective input optical signal of a first wavelength and provides an output optical signal of the first wavelength (i.e., no conversion) or one of the other M-1 wavelengths. The tunable wavelength converter 124 may be implemented using any optical component that converts the wavelength of an optical signal used to carry a payload.

The combiner 156 operates to combine all of the output optical signals from the wavelength converters 154 into a new DWDM optical signal. It is noted that the conversion process is controlled such that the optical signals received by the combiner 126 have different wavelengths. The output of the combiners 126 of the N tuner modules 120 is communicated to a corresponding one of N input ports of the second N×N cyclic AWG 160. If necessary, optical amplifiers 158 maybe used to amplify the recombined optical signal to compensate for internal loss.

The second N×N cyclic AWG 160 is structurally the same as the first n×N cyclic AWG 140. The second N×N AWG 160 selectively routes optical signals from N input ports to the N output ports according to wavelength. Each one of the N input ports communicatively receives a corresponding recombined optical signal from the respective output port of the middle stage. The second AWG 160 receives the respective optical signals and selectively distributes them to the outputs (1 to N) in a cyclical manner well known in the art.

Switching at a granularity level of wavebands with switching architecture 100 is strictly non-blocking. Any waveband from input port of AWG 140 is equally distributed over all intermediate ports. Therefore, every N wavelength can be redirected to any waveband at any output port by conversion to the corresponding permutation of wavelengths within the desired destination waveband. At the same time, fiber switching is still supported by directing all wavebands of any input port to the same output port of AWG 160. However, the order of wavelength channels within a waveband after switching is not preserved in most cases; therefore, a wavelength shuffler may be employed which will be described in FIG. 3.

Figure 2:
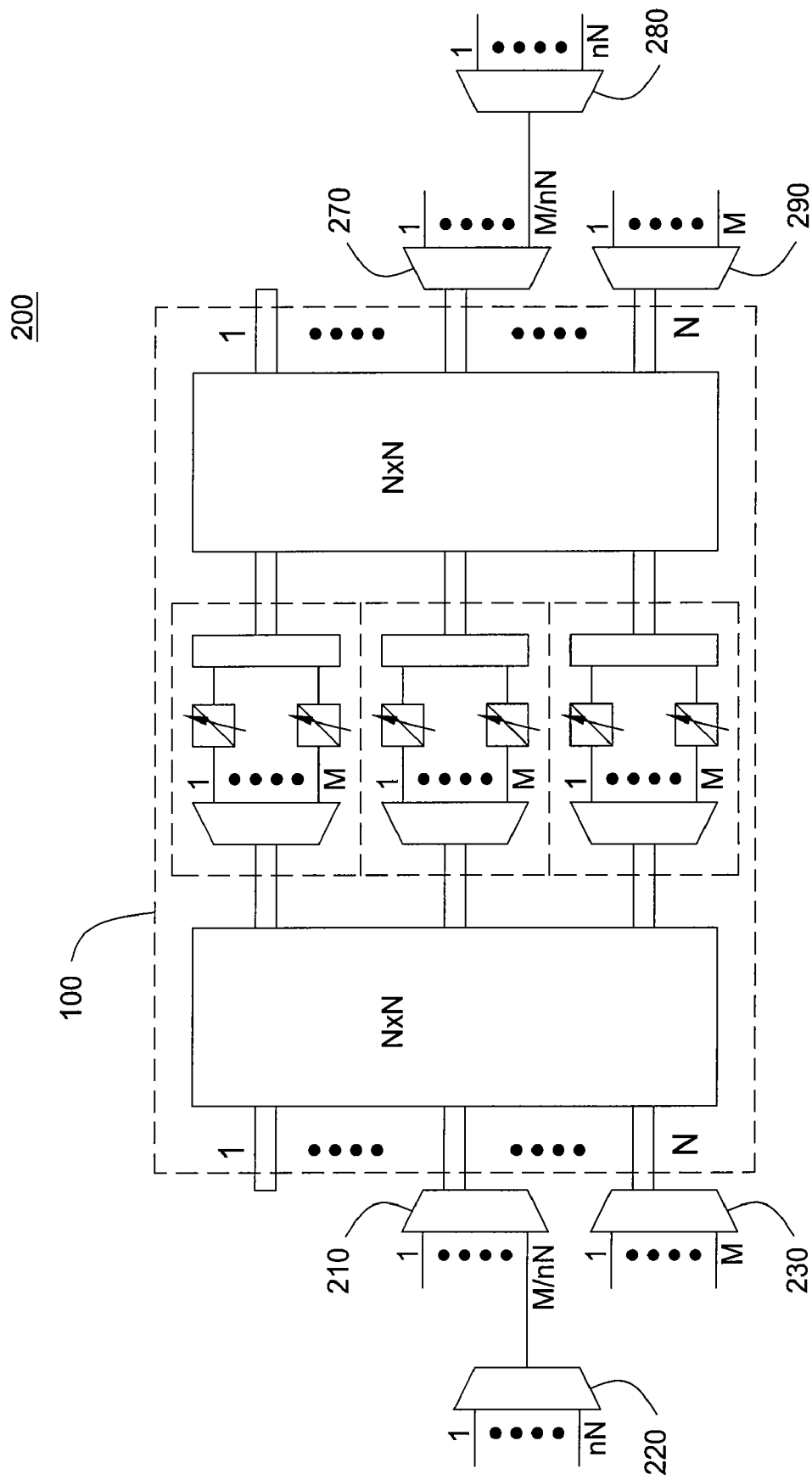
FIG. 2 depicts a block diagram of a highly scalable multi-granular switching architecture according to an embodiment of the invention.

FIG. 2 depicts a block diagram of a highly scalable multi-granular switching architecture 200 according to an embodiment of the invention. The multi-granular switching architecture 200 is located in an optical network and is in communications with other parts of the optical network such as metro networks, local networks, the core network, etc. This architecture 200 allows the switching of fibers, wavebands and wavelengths. The multi-granular switching architecture 200 includes a central switching architecture such as the strictly non-blocking switching architecture 100 described above, a waveband multiplexer 210, wavelength multiplexers 220, 230, a waveband demultiplexer 270, and wavelength demultiplexers 280, 290.

The central switching architecture 100 allows for the switching of wavebands as described in FIG. 1. However, it is also desirable to be able to add and to drop wavebands and wavelengths.

The waveband multiplexer 210 allows the central switching architecture 100 to add wavebands. The waveband multiplexer 210 combines a plurality of wavebands (1 through M/nN wavebands, where n is an integer ranging from 1 through M/N) and communicates the combined plurality of wavebands into the switching architecture 100. In another embodiment, the switching architecture 200 includes a plurality of waveband multiplexers 210 at a plurality of input ports.

The wavelength multiplexer 220 combines the received wavelengths forming wavebands. The wavelength multiplexer 220 combines a plurality of wavelengths and transmits the wavelengths as wavebands to the waveband multiplexer 210. This implementation allows the switching architecture 100 to also add wavelengths (1 through nN) to the switching architecture 200 as wavebands. Optionally, the multiplexed wavelength can be directly communicated to the switching architecture 100 through the wavelength multiplexer 230.

The wavelength multiplexer 230 can combine up to M optical wavelengths which are then directly communicated into the switch architecture 100. Thus, this implementation allows switching architecture 100 to add wavelengths to the optical network.

The waveband demultiplexer 270 allows the switching architecture 200 to drop wavebands. The waveband demultiplexer 270 separates a plurality of wavebands (1 through M/nN) and drops any combination of the plurality of wavebands as desired.

This implementation allows the switching architecture 100 to also drop wavelengths (1 through nN) from the dropped wavebands (1 through M/nN). The wavelength demultiplexer 280 drops the wavelength within the dropped waveband. The wavelength demultiplexer 280 separates a plurality of wavelengths and drops any combination of the wavelengths as desired. Optionally, the wavelengths can be directly dropped through the wavelength demultiplexer 290. The wavelength demultiplexer 290 can drop up to M optical wavelengths. Thus, this implementation also allows switch architecture 100 to directly drop wavelengths from the optical network.

Figure 3:
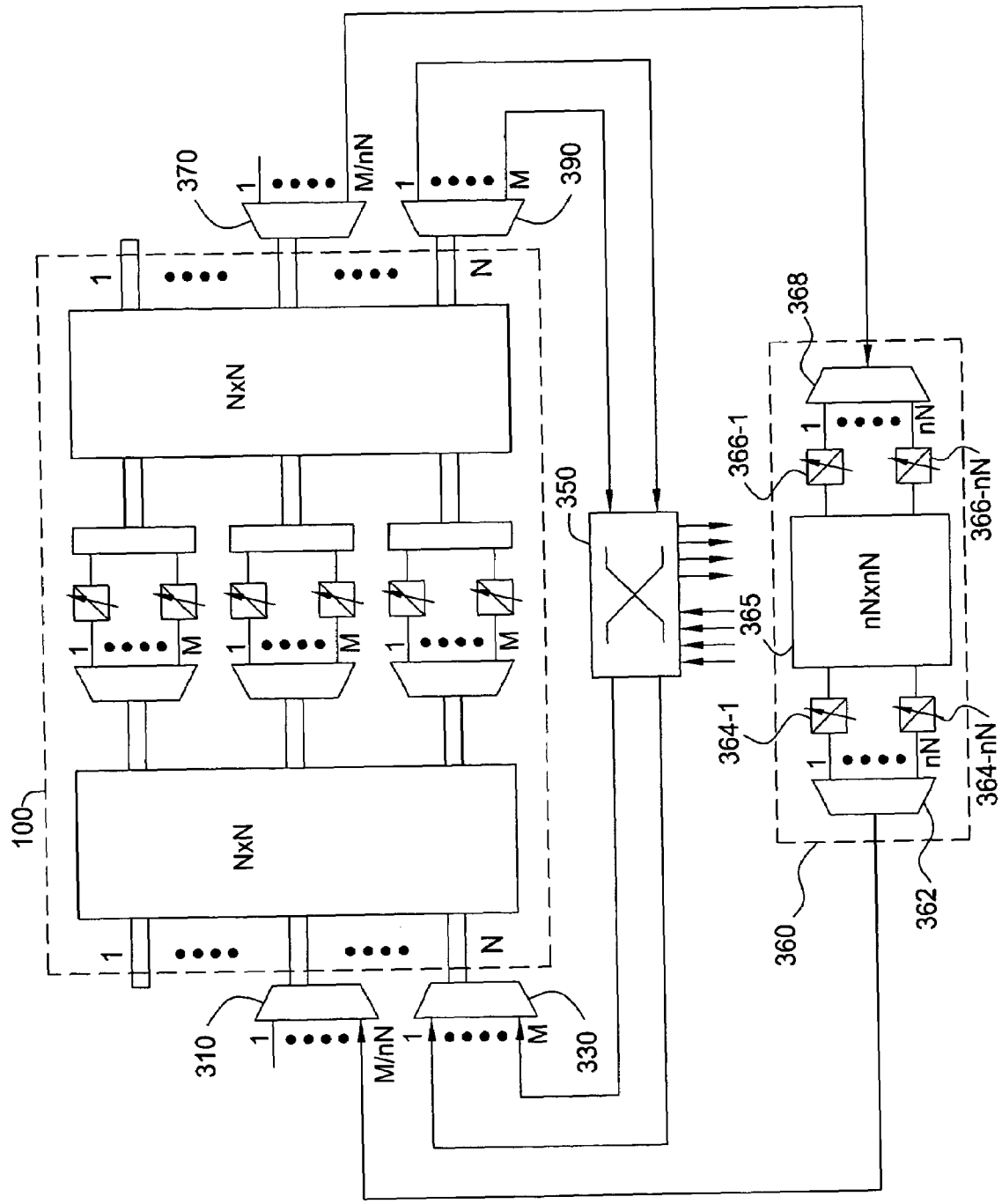
FIG. 3 depicts another block diagram of a highly scalable multi-granular switching architecture according to an embodiment of the invention.

FIG. 3 depicts another block diagram of a highly scalable multi-granular switching architecture 300 according to an embodiment of the invention. The embodiment of switching architecture 300 allows the switching of optical signals from the core network, metro networks and local networks. The switching architecture of 300 also performs the function of adding and dropping channels. The embodiment of FIG. 3 includes the central switching architecture 100, a waveband multiplexer 310, a wavelength multiplexer 330, a switch 350 having client ports for adding and dropping, a wavelength shuffler 360, a waveband demultiplexer 370, and a wavelength demultiplexer 390.

The central switching architecture 100 allows for the switching of wavebands as described in FIG. 1. In this embodiment, the ports of the switching architecture are communicatively coupled to the core network, the metro networks and local networks.

The waveband multiplexer 310 allows the switching architecture 300 to add wavebands. The waveband multiplexer 310 functions substantially the same as the waveband multiplexer 210 of FIG. 2. A wavelength multiplexer (not shown) similar to wavelength multiplexer 220 may also be included in order to add wavelengths to waveband. The wavebands maybe received from any optical network or location that is communicating with the switching architecture 300. For example, the waveband may be from another metro network. The waveband may be from the wavelength shuffler 360 of optical signals from the dropped waveband of the switching architecture 300.

The wavelength multiplexer 330 allows the channel wavelengths from the client add ports of switch 350 to be combined for switching at the central switch architecture 100. The wavelength multiplexer 330 can add up to M optical wavelengths which is combined and directly communicated to the switch architecture 300. In a further embodiment, the combined wavelength may be further multiplexed with other wavebands before being routed in the switching architecture 100.

The waveband demultiplexer 370, similar to the waveband demultiplexer 270 described above, allows the switching architecture 200 to drop wavebands. The waveband multiplexer 370 separates a plurality of wavebands (1 to M/nN wavebands) and drops any combination of the plurality of wavebands as desired. As described above, a wavelength demultiplexer (not shown) may also be included in order to drop wavelengths. In a further embodiment, the switching architecture may include a plurality of waveband demultiplexers and some may even include wavelength demultiplexers for dropping individual wavelengths from the dropped wavebands.

The wavelength demultiplexer 390 separates a plurality of wavelengths and drops the wavelengths as desired. The wavelength demultiplexer 390 can drop up to M optical wavelengths similar to the wavelength demultiplexer of 290. The dropped optical wavelengths is dropped by switch 350 at client drop ports located at the switch 350 which is described below.

The switch 350 of switching architecture 300 allows the switching architecture 300 to add, drop, and shuffle wavelengths. The switch 350 has a plurality of input ports, a plurality of output ports, and a plurality of client add and drop ports. The plurality of wavelengths dropped by the wavelength demultiplexer 390 is received by the switch 350 through the plurality of input ports at the switch 350. The switch 350 can drop any combination of the wavelengths by switching the wavelengths to be dropped to the desired client drop port. The switch can also add any combination of the wavelengths back to the optical network by switching the desired wavelengths to be feedback to the network through the output ports and by-passing switch 350. The switch 350 can add any combination of wavelengths by switching the wavelengths to be added from the client add ports where the additional wavelengths will be switched by the switch 350 and communicated to the architecture 100 through the plurality of output ports of switch 350. Advantageously, the wavelength multiplexer 330, wavelength demultiplexer 390 and the switch 350 allows the switching architecture 100 to perform add/drop functions.

The switch 350 may be an electrical switch or an optical switch. In one embodiment, the switch 350 is an optical switch. Individual wavelengths can be interchanged between wavebands in a bit rate and protocol transparent fashion. A router (not shown) with optical interfaces may be communicatively coupled to the client add/drop ports.

In another embodiment, the switch 350 of FIG. 3 is an electrical switch. The wavelengths will need to be converted from optical signals to electrical signals to be switched. After the optical to electrical conversion, the electrical signals from the converted wavelengths will be switched and dropped through the client drop ports. If the information on the signals is to be returned to the architecture 100, the electrical signals will be converted back to optical signals and communicated to architecture 100 through the output ports of the switch 350. The electrical switch can optionally include intelligence and protocol support such as IP routers, legacy SDH, Ethernet, etc.

The wavelength shuffler 360 allows the switching architecture 300 to preserve the wavelength order in a waveband. The wavelength shuffler 360 has a shuffler demultiplexer 368, a first set of nN tunable wavelength converters (366-1 to 366-nN, tunable), an nN×nN cyclic AWG 365, a second set of nN fixed wavelength converters (364-1 to 364-nN), and a shuffler multiplexer 362.

If the information within a waveband at the output of the switching architecture 300 needs to be transported as a different wavelength, the information within the waveband is communicated to the wavelength shuffler 360 where the information is shuffled to a desired wavelength for sending onto the optical network. The wavelength shuffler 360 receives at least one waveband from the waveband demultiplexer 370. The received waveband is separated into nN wavelengths by the shuffler demultiplexer 368. Each one of the nN wavelengths is individually tuned by the respective tunable wavelength converter of the first set of nN wavelength converters. The nN×nN AWG 365 has nN input ports cyclically coupled to nN output ports as described above. The tuned wavelengths are then switched by the nN×nN cyclic AWG 365 from the respective input ports to the respective output ports depending on its wavelength. The switched wavelength is converted again by the respective fixed wavelength converter (364-1 to 364-nN) of the second set of wavelength converters. The wavelengths converted by the second set of wavelength converters (fixed) are combined by the shuffler multiplexer 360 into a waveband. The shuffled waveband is combined with other wavebands at waveband multiplexer 310 to be communicated to the switching architecture 100 for transport onto the optical network. The wavelength shuffler may also be implemented using similar structure of converter arrays as in the middle stage 150.

In addition to providing add/drop function, the switching architecture 300 also advantageously provides other functions such as optical bypass function and core to metro connectivity function. For the switching architecture 300 to provide optical bypass function, the optical signal being communicated to the N input ports architecture 300 and is switched to one of its complementary output ports. The tunable wavelength converter of the middle stage 150 performing the wavelength conversion will tune and convert the received waveband to the same wavelength. The waveband being communicated from the switching architecture 300 will have the same optical characteristics as the received optical signal.

For the switching architecture 300 to provide core to metro connectivity function, the switching architecture 300 is in communications with both the optical core network and other metro networks. The switching architecture 300 can include waveband filters (not shown) which enables direct access to individual wavebands similar to the waveband demultiplexers 370 as described above in FIG. 3. Wavebands from the metro networks can then be multiplexed by the waveband multiplexer 310 and switched to the output port of the switching architecture 100 via one or more wavebands to the core network.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. An optical switching architecture comprising:
 a multiplexing stage, adapted for selectively combining component channel wavelengths from a plurality of distinct optical networks;
 a first N×N cyclic arrayed waveguide grating(AWG), for cyclically routing component channel wavelengths of N received wavelength division multiplexed (WDM) optical signals to provide thereby N first routed WDM optical signals, wherein N is an integer;
 a middle stage, for selectively converting respective component channel wavelengths of said N first routed WDM optical signals to a different optical wavelength to provide thereby N first processed WDM optical signals;
 a second N×N cyclic AWG, for cyclically routing component channel wavelengths of said N first processed WDM optical signals to provide thereby N second routed WDM optical signals; and
 at least one feedback shuffler for receiving a waveband from the second AWG, modifying spectral allocations associated with the received waveband channels, and communicating the modified waveband to the first N×N cyclic AWG, wherein the wavelength order within a waveband is preserved; and
 wherein the N received WDM optical signals of the distinct optical networks includes at least core and metro network optical signals, and said second routed WDM optical signals are provided at any selected output of the second N×N cyclic AWG.

2. The architecture of claim 1, further comprising:
 an add/drop switch that selectively drops wavelengths from the second AWG and selectively adds wavelengths to the first AWG; and
 wherein the said at least one feedback shuffler further comprises:
 a demultiplexer for separating the received wavebands from the second AWG;
 a plurality of wavelength converters for selectively changing the wavelengths of the component channel wavelengths of the received waveband;
 an nN×nN cyclic AWG, for cyclically shifting component channel wavelengths, wherein n is an integer between 1 and M/N, and wherein M is the total number of wavelengths in all wavebands; and
 a multiplexer, for combining the component channel wavelengths thereby providing a shuffled waveband.

3. The architecture of claim 2, wherein the switch comprises an optical switch.

4. The architecture of claim 2, wherein the switch comprises an electrical switch.

5. The architecture of claim 1, wherein an input WDM optical signal may by-pass the optical switching architecture and is transported from the second AWG having the same characteristics.

6. The architecture of claim 1, further comprising a demultiplexer stage, wherein waveband demultiplexers and wavelength demultiplexers are able to drop a combination of wavelengths and wavebands from the second AWG.

7. The architecture of claim 1, wherein:
 the middle stage includes a plurality of tuner modules, each of the tuner modules adapted to process one WDM optical signal, each of the tuner modules comprising:
 a demultiplexer, for extracting component channels from the respective WDM optical signal;
 a plurality of wavelength converters, for selectively changing component channels wavelengths, and
 a combiner, for combining component channels to provide a processed WDM optical signal.

8. The architecture of claim 2, wherein the feedback shuffler includes tunable wavelength converters and fixed wavelength converters.

9. A method comprising:
 combining component channel wavelengths from a plurality of distinct optical networks including at least core and metro network optical signals to provide thereby N received wavelength division multiplexed (WDM) optical signals, wherein N is an integer;
 cyclically routing component channel wavelengths of N received WDM optical signals to different optical wavelength to provide thereby N first routed WDM optical signals;
 selectively converting respective component channel wavelengths of said N first routed WDM optical signals to different optical wavelength to provide thereby N first processed WDM optical signals;
 cyclically routing component channel wavelengths of said N first processed WDM signals to provide thereby N second routed WDM optical signals;

shuffling wavebands of the N second routed WDM optical signals with a feedback shuffler to provide thereby shuffled wavebands; and adding the shuffled wavebands to the N received WDM optical signals, wherein the wavelength order within a waveband is preserved.

10. An optical network comprising:

a first N×N cyclic arrayed waveguide grating (AWG) for cyclically routing wavebands of N unprocessed WDM optical signals;

a middle stage, for selectively converting respective channels of said wavebands to different optical wavelengths to provide thereby N processed WDM optical signals;

a second N×N cyclic AWG; for cyclically routing N processed WDM optical signals;

an add/drop switch for receiving wavelengths from the second AWG for dropping and selectively communicating added optical signals to the first AWG; and at least one feedback shuffler for receiving a waveband from the second AWG, modifying spectral allocations associated with the received waveband channels, and communicating the modified waveband to the first N×N cyclic AWG, wherein wavelength order within a waveband is preserved.

11. The network of claim 10, wherein the switch comprises an optical switch.

12. The network of claim 10, wherein the switch comprises an electrical switch.

13. The network of claim 10, wherein the input WDM optical signal by-passes the optical switching architecture and is transported from the second AWG having the same characteristics.

14. The network of claim 10, further comprising a demultiplexer stage, wherein waveband demultiplexers and wavelength demultiplexers are able to drop a combination of wavelengths and wavebands from the second AWG.

15. The network of claim 10, wherein:

the middle stage includes a plurality of tuner modules, each of the tuner modules adapted to process one WDM optical signal, each of the tuner modules comprising:

a demultiplexer, for extracting component channels from the respective WDM optical signal;

a plurality of wavelength converters, for selectively changing component channels wavelengths, and a combiner, for combining component channels to provide a processed WDM optical signal.

16. The network of claim 10, wherein the feedback shuffler includes tunable wavelength converters and fixed wavelength converters.

17. The method of claim 9, further comprising:

selectively dropping wavelengths from the second routed WDM optical signals to provide thereby dropped wavelengths;

selectively adding the dropped wavelengths to the N received WDM optical signals.

* * * * *